United States Patent
Miyata et al.

(10) Patent No.: US 10,067,005 B2
(45) Date of Patent: Sep. 4, 2018

(54) APPARATUS FOR ESTIMATING TEMPERATURES OF VEHICLE

(71) Applicant: MITSUBISHI JIDOSHA KOGYO KABUSHIKI KAISHA, Tokyo (JP)

(72) Inventors: Toshiyuki Miyata, Tokyo (JP); Sumio Tanaka, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 415 days.

(21) Appl. No.: 14/662,945

(22) Filed: Mar. 19, 2015

(65) Prior Publication Data

US 2015/0268102 A1  Sep. 24, 2015

(30) Foreign Application Priority Data

Mar. 20, 2014 (JP) .................................. 2014-058487

(51) Int. Cl.
*G01K 13/02* (2006.01)
*G01K 11/00* (2006.01)
(Continued)

(52) U.S. Cl.
CPC ............ *G01K 13/02* (2013.01); *F01N 11/005* (2013.01); *F02D 41/042* (2013.01);
(Continued)

(58) Field of Classification Search
CPC .......... G01K 13/02; G01K 7/42; G01K 11/00; G01K 2205/04; F02D 41/042; F02D 41/1447; F02D 2200/021; F02D 2200/0416; F02D 2200/0804; F02D 2200/501; F01N 11/005; F01N 2900/1602;
(Continued)

(56) References Cited

U.S. PATENT DOCUMENTS 5,722,236 A * 3/1998 Cullen ................. F01N 3/0814
60/274
2005/0216176 A1 9/2005 Ichimoto et al.
(Continued)

FOREIGN PATENT DOCUMENTS

JP 11-82143 A 3/1999
JP 2005-273530 A 10/2005
(Continued)

OTHER PUBLICATIONS

Nose et al., ("Fuel Enrichment Control System by Catalyst Temperature Estimation to Enable Frequent Stoichiometric Operation at High Engine Speed/Load Condition," SAE conferenc. 2013), abstract included.*

*Primary Examiner* — Yasser A Abdelaziez
(74) *Attorney, Agent, or Firm* — Birch, Stewart, Kolasch & Birch, LLP

(57) ABSTRACT

An apparatus for estimating temperatures of a vehicle includes an acquirer to acquire an engine correlated temperature correlated with the temperature of an engine when the engine is stopping. The apparatus further includes an estimator to estimate a catalyst temperature of a catalyst disposed in an exhaust system of the engine, based on an inlet gas temperature estimated through a first-order lag operation with an exhaust-manifold temperature at a stop of the engine as an initial temperature and the engine correlated temperature as a target temperature.

11 Claims, 3 Drawing Sheets

(51) Int. Cl.
 *G01K 7/42* (2006.01)
 *F01N 11/00* (2006.01)
 *F02D 41/04* (2006.01)
 *F02D 41/14* (2006.01)
 *F02N 11/08* (2006.01)

(52) U.S. Cl.
 CPC ........... *F02D 41/1447* (2013.01); *G01K 7/42* (2013.01); *G01K 11/00* (2013.01); *F01N 2900/0422* (2013.01); *F01N 2900/0601* (2013.01); *F01N 2900/1404* (2013.01); *F01N 2900/1602* (2013.01); *F02D 2200/021* (2013.01); *F02D 2200/0416* (2013.01); *F02D 2200/0804* (2013.01); *F02D 2200/501* (2013.01); *F02N 11/0814* (2013.01); *G01K 2205/04* (2013.01); *Y02T 10/47* (2013.01)

(58) Field of Classification Search
 CPC ..... F01N 2900/0422; F01N 2900/0601; F01N 2900/1404; F02N 11/0814; Y02T 10/47
 See application file for complete search history.

(56) References Cited

U.S. PATENT DOCUMENTS

| | | | |
|---|---|---|---|
| 2011/0139133 A1* | 6/2011 | Surnilla | F02D 41/0055 123/568.12 |
| 2011/0231081 A1* | 9/2011 | Suzuki | F01N 11/005 701/104 |

FOREIGN PATENT DOCUMENTS

| | | |
|---|---|---|
| JP | 2007-303300 A | 11/2007 |
| JP | 2007-309208 A | 11/2007 |
| WO | WO 2010/013365 A1 | 2/2010 |

\* cited by examiner

APPARATUS FOR ESTIMATING TEMPERATURES OF VEHICLE

CROSS-REFERENCE TO THE RELATED APPLICATION

This application incorporates by references the subject matter of Application No. 2014-058487 filed in Japan on Mar. 20, 2014 on which a priority claim is based under 35 U.S.C. § 119(a).

FIELD

The present invention relates to an apparatus for estimating temperatures in an exhaust system of an engine in a vehicle.

BACKGROUND

Traditional techniques estimate temperatures in exhaust systems of operating engines on the basis of the operating state of the engines. For example, a typical technique estimates the temperature of a catalyst disposed in the exhaust system of the engine and the temperature of exhaust gas flowing into the catalyst on the basis of the amount of heat generated in the engine. Unfortunately, this technique is difficult to adopt for estimation of temperatures in an exhaust system of a nonoperating engine because the stopping engine generates no heat. In order to solve this problem, an improved technique estimates temperatures in an exhaust system of a stopping engine in view of the balance of heat traveling in the catalyst (for example, refer to International Publication No. WO 2010/013365 A1).

Unfortunately, the amount of heat traveling in the catalyst varies depending on the shape of the catalyst, the composition of a catalytic element, the type of a carrier, the internal structure, and the amount of heat generated by catalytic reaction of components of exhaust gas. It is thus difficult to specify a calorimetric model for accurate temperature estimation, leading to low accuracy of estimating temperatures in the exhaust system. In addition, the temperature of the catalyst varies depending on the environmental temperature (ambient temperature) and the amount of heat remaining in the engine or the exhaust system connected to the catalyst. Thus, the information on the balance of heat traveling in the catalyst alone is insufficient for accurate estimation of the temperature of the catalyst.

The temperatures can be directly detected with two or more thermosensors disposed upstream and downstream of the catalyst. Unfortunately, the apparatus can include the limited number of thermosensors since an increase in the number raises the costs. Installing a great number of thermosensors in an exhaust path may lead to insufficient accommodation for the thermosensors.

SUMMARY

An apparatus for estimating temperatures of a vehicle disclosed herein includes an acquirer to acquire an engine correlated temperature correlated with the temperature of an engine in a standby mode. That is, the engine correlated temperature is acquired by the acquirer when the engine is stopping. The apparatus further includes an estimator to estimate a catalyst temperature of a catalyst disposed in an exhaust system of the engine, based on an inlet gas temperature estimated through a first-order lag operation with an exhaust-manifold temperature at a stop of the engine as an initial temperature and the engine correlated temperature as a target temperature.

Examples of the engine correlated temperature include the temperature of engine cooling water, the temperature of intake air (e.g., a temperature detected with a thermosensor disposed in an intake system), the temperature of engine oil, the temperature of a cylinder block, and the air temperature in an engine compartment.

The exhaust-manifold temperature indicates the temperature of an exhaust manifold of the engine. The inlet gas temperature indicates the temperature of exhaust gas at the inlet of the catalyst (exhaust gas remaining at the inlet of the catalyst during the stop of the engine).

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A temperature estimating apparatus in a vehicle according to embodiments of the invention will now be described with reference to the accompanying drawings. The embodiments are mere illustrative examples and should not be construed to exclude application of various modifications or techniques that are not described in the embodiments. The individual features of the embodiments may be modified in various manners without departing from the gist of the invention, or may be selectively employed as necessary or properly combined with one another.

[1. Vehicle]

Figure 1:
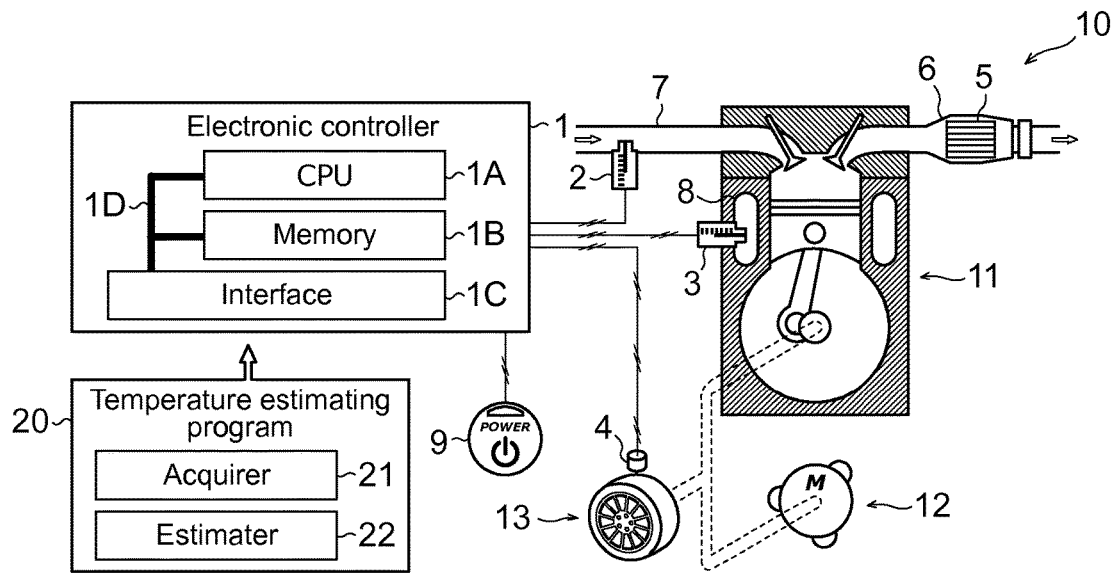
FIG. 1 is a schematic diagram illustrating a temperature estimating apparatus and its control in a vehicle.

A temperature estimating apparatus according to an embodiment serves as an electronic controller 1 in a vehicle 10 illustrated in FIG. 1. The vehicle 10 is of a hybrid type and includes an engine 11 and a motor 12 in a power train. The electronic controller 1 is a computer that comprehensively controls the engine 11 and the motor 12. The engine 11 is an internal combustion engine (e.g., a gasoline or diesel engine) fueled with gasoline or light oil. The engine 11 has an idling stop function to automatically stop and restart in response to the stop and start, respectively, of the vehicle 10. The motor 12 is an electric motor moved by a battery (not shown). The driving force generated in each of the engine 11 and the motor 12 is transmitted to wheels 13 via a power transmitting mechanism illustrated with a broken line in FIG. 1.

The power transmitting mechanism includes a clutch for separately controlling the transmission of the driving force generated in the engine 11 and the motor 12. The control of the engagement or disengagement of the clutch can switch multiple transmission modes of the driving force through different paths from the power train to the wheels 13. The vehicle 10 has an EV mode to be driven by the driving force from the motor 12 at least during the stop of the engine 11. The engagement or disengagement of the clutch is controlled by the electronic controller 1. The interior of an exhaust manifold 6 of the engine 11 or an exhaust path downstream of the exhaust manifold 6 is provided with a catalyst 5 for purifying exhaust gas.

An intake path 7 of the engine 11 is equipped with an air thermosensor 2 for detecting the air temperature (intake-air temperature AT) in the intake path 7. A water jacket 8 of the engine 11 is equipped with a water thermosensor 3 for detecting the temperature (water temperature WT) of engine cooling water. The paths for transmitting driving force from the power train to the wheels 13 are equipped with a speed sensor 4 for detecting the number of revolutions of the wheels 13 (speed V, velocity) corresponding to the running speed of the vehicle 10. The information detected with the sensors 2 to 4 is transmitted to the electronic controller 1.

The intake-air temperature AT and the water temperature WT are each an engine 11 correlated temperature correlated with the temperature of the operating or nonoperating engine 11, and are detected at any time even during the stop of the engine 11. Other examples of the engine correlated temperature include the temperature of engine oil in the engine 11, the temperature of a cylinder block, and the air temperature in an engine compartment. The speed V contributes to the evaluation of a rate of decrease in temperatures in the exhaust system of the engine 11 (i.e., heat conductivity to the outside of the vehicle 10).

A vehicle cabin is provided with a main power switch 9 at any position for turning on or off control systems in the vehicle 10. In response to the power-on of the power switch 9, the electronic controller 1 is energized or activated, so that the vehicle 10 can be driven by the driving force from the motor 12. If the battery is too low to drive the motor 12, the engine 11 can start generation under the control of the electronic controller 1 or can supply driving force.

The electronic controller 1 according to the embodiment executes a temperature estimating control for estimating temperatures in the exhaust system during the stop of the engine 11. The temperature estimating control involves the estimation of temperatures at three sites in the exhaust system, i.e., a catalyst temperature $T_{CAT}$ indicating the temperature of the catalyst 5, an inlet gas temperature $T_{GAS}$ indicating the temperature of exhaust gas near the inlet of the catalyst 5 (near the top end of a carrier supporting a catalytic element), and an exhaust-manifold temperature $T_{EXM}$ indicating the temperature of the exhaust manifold 6 upstream of the catalyst 5 in the flow of exhaust gas.

The "stop of the engine 11" involves both the idling stop of the engine 11 and the stop of the engine 11 in the EV mode. In other words, the temperatures in the exhaust system are estimated not only during the stop of the vehicle 10 but also during the running of the vehicle 10. The EV mode is appropriately selected based on the driving state (e.g., the speed V or the amount of charge in the battery) of the vehicle 10 or an operation by a driver.

The temperature estimating control is executed both during the stop of the vehicle 10 with relatively stable environment around the catalyst 5 and during the running of the vehicle 10 with dynamically variable environment. In general, a variation in the environment around the catalyst 5 changes the amount of heat traveling between the catalyst 5 and the environment, which phenomenon inhibits accurate estimation of the catalyst temperature $T_{CAT}$. In the temperature estimating control according to the embodiment, the gas temperature $T_{GAS}$ at the inlet of the catalyst 5 can be represented as a first-order lag from an engine correlated temperature, which is detected regardless of the operating mode of the engine 11. The exhaust-manifold temperature $T_{EXM}$ can also be represented as a first-order lag from the engine correlated temperature. The catalyst temperature $T_{CAT}$ gradually varies with a decrease in the temperature of exhaust gas remaining in the exhaust system, and thus can be represented as a first-order lag from the inlet gas temperature $T_{GAS}$ (i.e., the temperature of exhaust gas at the inlet of the catalyst 5).

The electronic controller 1 also executes a normal temperature estimating control (a usual temperature estimating control) for estimating temperatures in the exhaust system during the operation of the engine 11. The normal temperature estimating control may use any known estimation technique. For example, the catalyst temperature $T_{CAT}$, the inlet gas temperature $T_{GAS}$, and the exhaust-manifold temperature TERM may be estimated based on the amount of heat generated in the engine 11 or the operating mode of the engine 11. Alternatively, the estimation may involves the specification of the operating point of the engine 11 on the basis of the number of revolutions of the engine 11, the load on the engine 11, the volume of injection of fuel, or the volume of intake air; and the calculation of steady-state values of the catalyst temperature $T_{CAT}$, the inlet gas temperature $T_{GAS}$, and the exhaust-manifold temperature TERM corresponding to the operating point. The steady-state values each indicate a value to which the temperature converges if the engine 11 remains at the operating point. First-order lag operations to the respective steady-state values can provide estimated values of the catalyst temperature $T_{CAT}$, the inlet gas temperature $T_{GAS}$, and the exhaust-manifold temperature TERM during the operation of the engine 11.

[2. Electronic Controller]

An electronic controller (electronic control unit (ECU), controller) 1 comprehensively controls various components in the power train, and is connected to a communication line of an in-vehicle network. The electronic controller 1 is composed of, for example, an electronic device into which a microprocessor, such as a central processing unit (CPU) or a micro processing unit (MPU), a read only memory (ROM), and a random access memory (RAM) are integrated. The electronic controller 1 controls the operating modes of the engine 11 and the motor 12 and controls the temperature estimation.

FIG. 1 illustrates an example hardware configuration of the electronic controller 1. The electronic controller 1 includes a CPU (processor) 1A, a memory 1B, and an interface 1C, which are connected to each other via an internal bus 1D for mutual communication. These components 1A to 1C are energized by a power source (not shown; e.g., an in-vehicle battery or a button battery) while the power switch 9 is closed.

The CPU 1A is a processor including a control unit (control circuit), an arithmetic unit (arithmetic circuit), and a cache memory (registers). The memory 1B includes a short-term memory cell (e.g., a read only memory (ROM) or a random access memory (RAM)) for temporarily storing programs and working data; and a long-term memory cell (e.g., a non-volatile memory, such as a flush memory or an electrically erasable programmable read-only memory (EEPROM)) for storing data and programs to be stored for long periods.

The interface 1C mediates the input and output (Input/Output; I/O) between the engine controller 1 and its outside. For example, the engine controller 1 is connected to the in-vehicle network via the interface 1C, or directly connected to the sensors 2 to 4. The in-vehicle network is also connected to other electronic controllers (e.g., an air conditioner ECU, a battery ECU, an EV ECU (an Electric-Vehicle overall ECU), an engine ECU, and a motor ECU), a display, and a speaker (which are not shown). These components may receive the results of calculation from the electronic controller 1.

FIG. 1 includes a block diagram illustrating the processes of the temperature estimating control (temperature estimating program 20) executed by the CPU 1A of the electronic controller 1. The processes are recorded in the long-term memory cell of the memory 1B, for example, in the form of application programs. The programs are loaded in a memory space of the short-term memory cell. The function of the temperature estimating program 20 is classified into two segments, i.e., an acquirer 21 and an estimator 22.

The acquirer 21 acquires engine correlated temperatures at least during the stop of the engine 11. That is, the acquirer 21 acquires engine correlated temperatures when the engine 11 is stopping. In this embodiment, the acquirer 21 acquires the intake-air temperature AT detected with the air thermosensor 2 and the water temperature WT detected with the water thermosensor 3 at any time, periodically. The acquirer 21 may acquire the temperature of engine oil in the engine 11, the temperature of the cylinder block, and/or the air temperature in the engine compartment, instead of the intake-air temperature AT and the water temperature WT. Information of the acquired intake-air temperature AT and water temperature WT is transmitted to the estimator 22.

The estimator 21 estimates the temperature $T_{CAT}$ of the catalyst 5 and the exhaust-manifold temperature $T_{EXM}$ when the engine 11 is stopping. The estimation of the catalyst temperature $T_{CAT}$ involves two steps, i.e., the estimation of the gas temperature $T_{GAS}$ at the inlet of the catalyst 5, and the estimation of the catalyst temperature $T_{CAT}$ based on the inlet gas temperature $T_{GAS}$.

[2-1. Estimation of Inlet Gas Temperature]

Figure 2A:
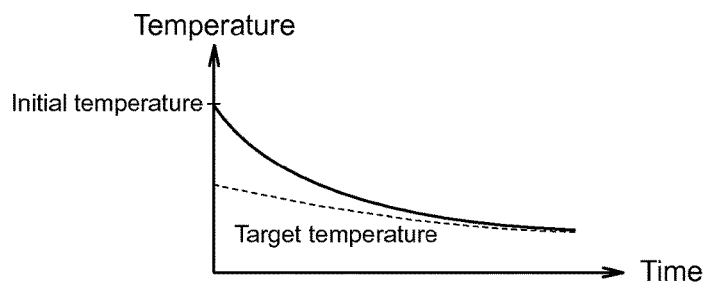
FIG. 2A is a graph illustrating a first-order lag operation.

The inlet gas temperature $T_{GAS}$ is estimated through a first-order lag operation with an engine correlated temperature as a target temperature. The exhaust-manifold temperature $T_{EXM}$ upon the stop of the engine 11 is set to the initial value (initial temperature) of the inlet gas temperature $T_{GAS}$. The exhaust-manifold temperature $T_{EXM}$ upon the stop of the engine 11 is calculated in advance in the normal temperature estimating control. The inlet gas temperature $T_{GAS}$ thus starts from the exhaust-manifold temperature $T_{EXM}$ upon the stop of the engine 11 and approaches the engine correlated temperature asymptotically, as illustrated in FIG. 2A. In the discrete calculation of the inlet gas temperature $T_{GAS}$ in a predetermined cycle, the current value of the inlet gas temperature $T_{GAS}$ is calculated through the addition of a first value and a second value. The first value is the product of a predetermined rate of change $K_{GAS}$ and the previous value of the inlet gas temperature $T_{GAS}$. The second value is the product of the difference of the rate of change $K_{GAS}$ from 1 and the current engine correlated temperature. The inlet gas temperature $T_{GAS}$ may also be estimated with any other technique or formula.

[2-2. Estimation of Catalyst Temperature]

The catalyst temperature $T_{CAT}$ is estimated through a first-order lag operation with the inlet gas temperature $T_{GAS}$ as a target temperature. The catalyst temperature $T_{CAT}$ upon the stop of the engine 11 is set to the initial value (initial temperature). The catalyst temperature $T_{CAT}$ upon the stop of the engine 11 is calculated in advance in the normal temperature estimating control. The catalyst temperature $T_{CAT}$ thus approaches the inlet gas temperature $T_{GAS}$ asymptotically. For example, the current value of the catalyst temperature $T_{CAT}$ is calculated through the addition of a third value and a fourth value. The third value is the product of a predetermined rate of change $K_{CAT}$ and the previous value of the catalyst temperature $T_{CAT}$. The fourth value is the product of the difference of the rate of change $K_{CAT}$ from 1 and the current value of the inlet gas temperature $T_{GAS}$. The catalyst temperature $T_{CAT}$ may also be estimated with any other technique or formula.

The rates of change $K_{CAT}$ and $K_{GAS}$ are each a factor providing a rate of change of the recurrence formula in the first-order lag operation and each correspond to a time constant. The rate of change $K_{CAT}$ for estimation of the catalyst temperature $T_{CAT}$ is also referred to as "first time constant $K_{CAT}$" and the rate of change $K_{GAS}$ for estimation of the inlet gas temperature $T_{GAS}$ is also referred to as "second time constant $K_{GAS}$" in the following description.

The first time constant $K_{CAT}$ indicates a rate of decrease in the catalyst temperature $T_{CAT}$ following a decrease in the temperature of exhaust gas remaining in the exhaust system. The second time constant $K_{GAS}$ indicates a rate of decrease in the temperature (inlet gas temperature Mils) of exhaust gas remaining in the exhaust system following a decrease in the temperature of the engine 11. These two rates of decrease each vary depending on the thermal capacity of the catalyst 5 and the volume of the exhaust manifold 6. The first time constant $K_{CAT}$ and the second time constant $K_{GAS}$ are thus independently determined.

The first time constant $K_{CAT}$ and the second time constant $K_{GAS}$ are determined based on the speed V. The second time constant $K_{GAS}$ decreases with an increase in the speed V. This phenomenon is caused because the amount of heat taken away from the exhaust manifold 6 to the outside of the vehicle 10 increases with the speed V. Accordingly, as the speed V increases, the estimated inlet gas temperature $T_{GAS}$ approaches the engine correlated temperature more rapidly. In the embodiment, the relationship between the speed V and the second time constant $K_{GAS}$ is determined such that the second time constant $K_{GAS}$ linearly varies with a negative gradient against the speed V, as illustrated with a broken line in FIG. 2B.

In contrast, the relationship between the speed V and the first time constant $K_{CAT}$ is determined such that the first time constant $K_{CAT}$ linearly varies with a gradient at least higher than that of the second time constant $K_{GAS}$ against the speed V. For example, the first time constant $K_{CAT}$ increases with the speed V, as illustrated with a solid line in FIG. 2B. Alternatively, as the speed V increases, the first time constant $K_{CAT}$ decreases with a gradient having a smaller absolute value than that of the second time constant $K_{GAS}$ (a negative gradient larger than that of the second time constant $K_{GAS}$), as illustrated with a one-dot chain line in FIG. 2B. This phenomenon is caused because the catalyst 5 conducts a smaller amount of heat to the outside of the vehicle 10 than the exhaust gas remaining in the exhaust system due to the larger thermal capacity of the carrier in the catalyst 5 than that of the exhaust gas. This feature can optimize the recurrence formula in the first-order lag operation for estimation of the catalyst temperature $T_{CAT}$ and improve the accuracy of estimating the catalyst temperature $T_{CAT}$.

[2-3. Estimation of Exhaust-Manifold Temperature]

The exhaust-manifold temperature $T_{EXM}$ is estimated through a first-order lag operation with an engine correlated temperature as a target temperature, in the same manner as the inlet gas temperature $T_{GAS}$. The exhaust-manifold temperature $T_{EXM}$ upon the stop of the engine 11 is set to the initial value (initial temperature). The exhaust-manifold temperature $T_{EXM}$ thus starts from the value upon the stop of the engine 11 and approaches the engine correlated temperature asymptotically. For example, the current value of the exhaust-manifold temperature $T_{EXM}$ is calculated through the addition of a fifth value and a sixth value. The fifth value is the product of a predetermined rate of change $K_{EXM}$ and the previous value of the exhaust-manifold temperature $T_{EXM}$. The sixth value is the product of the difference of the rate of change $K_{EXM}$ from 1 and the current engine correlated temperature. The exhaust-manifold temperature $T_{EXM}$ may also be estimated with any other technique or formula.

The rate of change $K_{EXM}$ is also a factor providing a rate of change of the recurrence formula in the first-order lag operation and corresponds to a time constant. The rate of change $K_{EXM}$ for estimation of the exhaust-manifold temperature $T_{EXM}$ is also referred to as "third time constant $K_{EXM}$" in the following description. The third time constant $K_{EXM}$ is also determined based on the speed V such that the third time constant $K_{EXM}$ decreases with an increase in the speed V. Accordingly, as the speed V increases, the estimated exhaust-manifold temperature $T_{EXM}$ approaches the engine correlated temperature more rapidly. In the embodiment, the relationship between the speed V and the third time constant $K_{EXM}$ is determined such that the third time constant $K_{EXM}$ linearly varies with a negative gradient against the speed V, in the same manner as the second time constant $K_{GAS}$. It is noted that the second time constant $K_{GAS}$ and the third time constant $K_{EXM}$ do not need to be identical and can be independently determined.

Information of the inlet gas temperature $T_{GAS}$, the catalyst temperature $T_{CAT}$, and the exhaust-manifold temperature $T_{EXM}$ estimated by the estimator 22 is recorded in the memory 1B of the electronic controller 1, to be used for control over other electronic controllers and various electrical components in the vehicle 10. For example, the temperatures can contribute to the temperature control over the catalyst 5 and various components disposed in the exhaust system of the engine 11, the control of exhaust gas recirculation (EGR), and the control of output from the engine 11.

[3. Flowchart]

Figure 3:
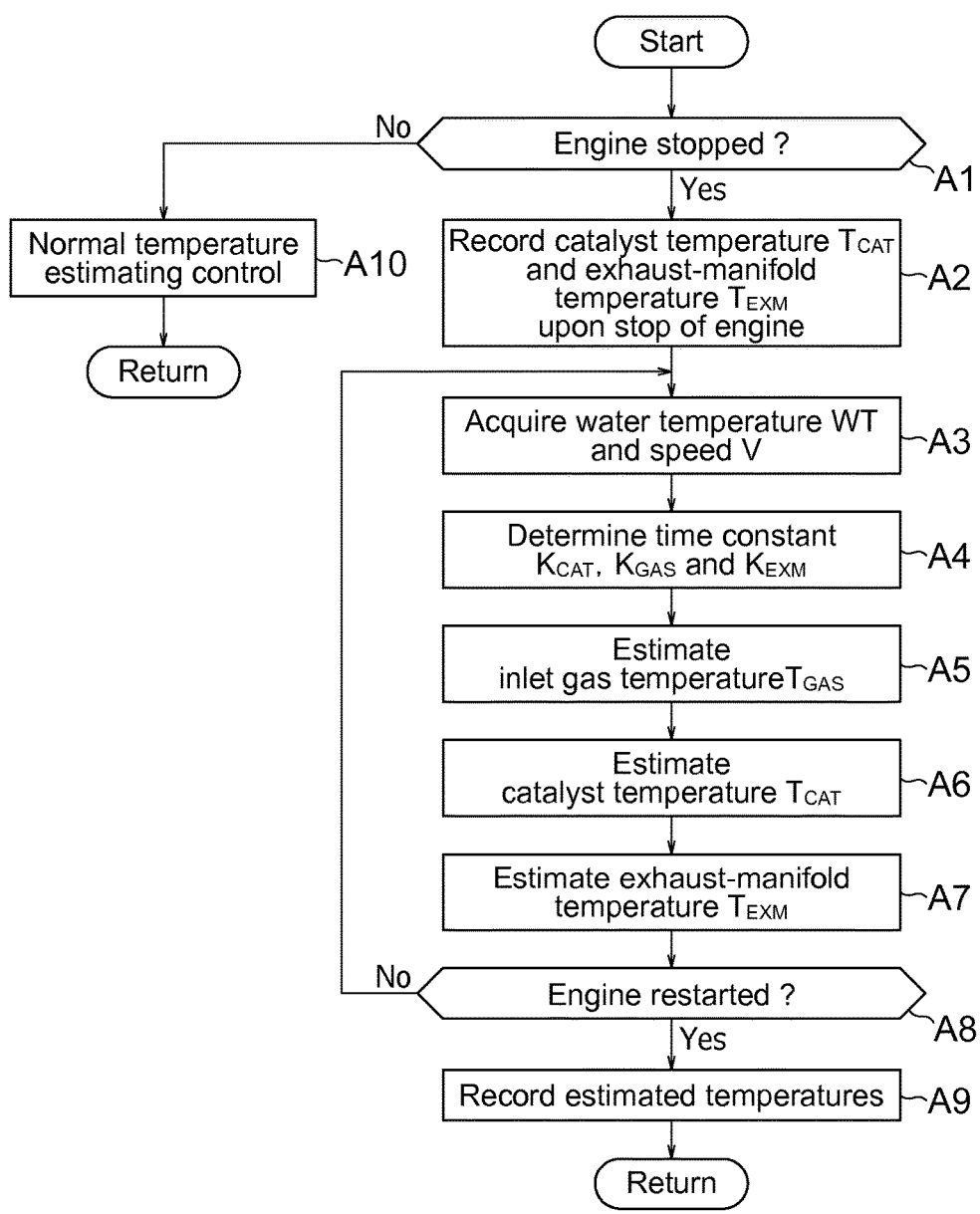
FIG. 3 is a flowchart illustrating an example control procedure.

FIG. 3 is a flowchart illustrating an example procedure of the temperature estimating control (program 20) base on the water temperature WT. This process is repeated in the electronic controller 1 while the power switch 9 is closed.

In Step A1, if the engine 11 is in a standby mode (that is, if the engine 11 is stopping), then the process goes to Step A2. The operating mode of the engine 11 can be determined with a known technique (e.g., based on the number of revolutions of the engine 11). If the engine 11 is not in the standby mode; then the process goes to Step A10, and the normal temperature estimating control is executed. In the normal temperature estimating control, the catalyst temperature $T_{CAT}$, the inlet gas temperature $T_{GAS}$, and the exhaust-manifold temperature $T_{EXM}$ are calculated or estimated, for example, on the basis of the operating state of the engine 11.

In Step A2, the catalyst temperature $T_{CAT}$ and the exhaust-manifold temperature $T_{EXM}$ that have already been calculated or estimated are recorded in the memory 1B of the electronic controller 1. These temperatures, which are the catalyst temperature $T_{CAT}$ and the exhaust-manifold temperature $T_{EXM}$ upon the stop of the engine 11, are referenced in the estimation of the current values of the inlet gas temperature $T_{GAS}$, the catalyst temperature $T_{CAT}$ and the exhaust-manifold temperature $T_{EXM}$.

In Step A3, the acquirer 21 acquires the water temperature WT detected with the water thermosensor 3 and the speed V detected with the speed sensor 4. If the temperature estimation uses the intake-air temperature AT instead of the water temperature WT, the acquirer 21 acquires the intake-air temperature AT detected with the air thermosensor 2.

In Step A4, the first time constant $K_{CAT}$, the second time constant $K_{GAS}$, and the third time constant $K_{EXM}$ are determined based on the speed V. For example, the time constants are each determined based on the map illustrated in FIG. 2B or formulae.

In Step A5, the estimator 22 calculates or estimates the gas temperature $T_{GAS}$ at the inlet of the catalyst 5 with the water temperature WT acquired in Step A3 as a target temperature. The estimation uses the exhaust-manifold temperature $T_{EXM}$ recorded in Step A2 as the initial value of the inlet gas temperature $T_{GAS}$, and the second time constant $K_{GAS}$ as a factor providing a rate of change of the recurrence formula in the first-order lag operation.

In Step A6, the estimator 22 calculates or estimates the temperature $T_{CAT}$ of the catalyst 5 with the inlet gas temperature $T_{GAS}$ estimated in Step A5 as a target temperature. The estimation uses the catalyst temperature $T_{CAT}$ recorded in Step A2 as the initial value, and the first time constant $K_{CAT}$ as a factor providing a rate of change of the recurrence formula in the first-order lag operation. The catalyst temperature $T_{CAT}$ is thus estimated through double first-order lag operations to a variation in the water temperature WT.

In Step A7, the estimator 22 calculates or estimates the exhaust-manifold temperature $T_{EXM}$ with the water temperature WT acquired in Step A3 as a target temperature. The estimation uses the exhaust-manifold temperature $T_{EXM}$ recorded in Step A2 as the initial value, and the third time constant $K_{EXM}$ as a factor providing a rate of change of the recurrence formula in the first-order lag operation.

In Step A8, if the engine 11 has not been restarted; then the process returns to Step A3 and the temperature estimating control is repeated. The water temperature WT and the speed V are updated in Step A3, and then the first time constant $K_{CAT}$, the second time constant $K_{GAS}$, and the third time constant $K_{EXM}$ are re-determined in Step A4. In Steps A5 and A7, the first-order lag operations are executed with the updated water temperature WT as a target temperature. The inlet gas temperature $T_{GAS}$ thus approaches the current water temperature WT at a rate corresponding to the second time constant $K_{GAS}$. The exhaust-manifold temperature TERM also approaches the current water temperature WT at a rate corresponding to the third time constant $K_{EXM}$. In Step A6, the catalyst temperature $T_{CAT}$ is estimated with the current value of the inlet gas temperature $T_{GAS}$ as a target temperature.

If the engine 11 has been restarted in Step A8; then the process goes to Step A9, and the current values of the catalyst temperature $T_{CAT}$, the inlet gas temperature $T_{GAS}$, and the exhaust-manifold temperature $T_{EXM}$ are recorded in the memory 1B. For example, these temperatures are set to the initial values for the estimation of temperatures in the normal temperature estimating control. Alternatively, the temperatures may be referenced in other known control, such as the control for heating the catalyst 5 for catalytic reaction or the control for preventing the exhaust system from heat damage.

[4. Advantageous Effects]

Figure 4A:
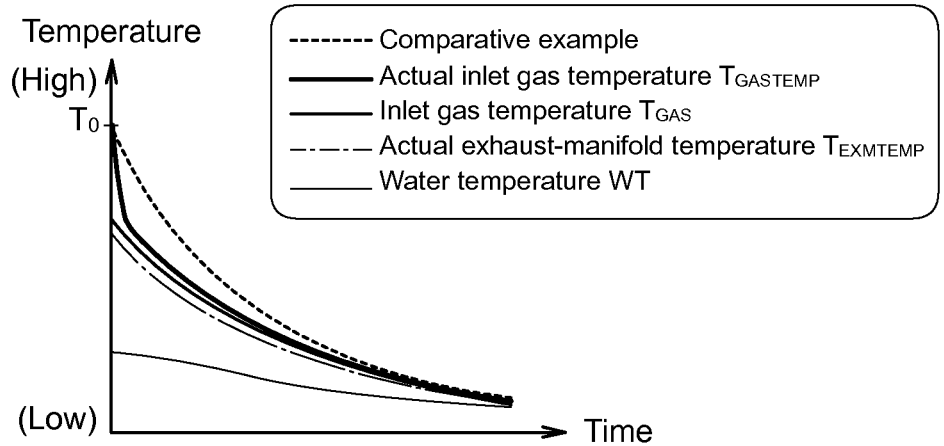
FIG. 4A is a graph illustrating an example relationship between the estimated inlet gas temperature $T_{GAS}$ and the actual inlet gas temperature $T_{GASTEMP}$.

In the temperature estimating control, the initial value of the gas temperature $T_{GAS}$ at the inlet of the catalyst 5 is defined by the exhaust-manifold temperature $T_{EXM}$ upon the stop of the engine 11. And the gas temperature $T_{GAS}$ is defined by the value determined by the first-order lag operation with the engine correlated temperature (e.g., the water temperature WT or the intake-air temperature AT) as a target temperature. FIG. 4A illustrates the relationship between the inlet gas temperature $T_{GAS}$ estimated when the engine 11 is stopped in the middle of a warming operation and its actual value (actual inlet gas temperature $T_{GASTEMP}$). The temperature $T_0$ in FIG. 4A indicates the temperature of exhaust gas remaining near the inlet of the catalyst 5 (i.e., the actual inlet gas temperature $T_{GASTEMP}$) upon the stop of the engine 11.

If the engine 11 is sufficiently warmed and then stopped, the exhaust manifold 6 is heated by the exhaust gas to a high temperature, so that the temperature To of the exhaust gas has a small difference from the actual exhaust-manifold temperature $T_{EXMTEMP}$. The inlet gas temperature $T_{GAS}$ and the actual exhaust-manifold temperature $T_{EXMTEMP}$ thus asymptotically approach the engine correlated temperature along similar paths.

In contrast, if the engine 11 is stopped before sufficient warming, the actual exhaust-manifold temperature $T_{EXMTEMP}$ is significantly lower than the temperature $T_0$ of the exhaust gas, as illustrated with a one-dot chain line in FIG. 4A. The actual inlet gas temperature $T_{GASTEMP}$ immediately after the stop of the engine 11 thus rapidly decreases as illustrated with a thick solid line in FIG. 4A, due to the low actual exhaust-manifold temperature $T_{EXMTEMP}$. The actual inlet gas temperature $T_{GASTEMP}$ asymptotically approaches the low actual exhaust-manifold temperature $T_{EXMTEMP}$ in a short time from the stop of the engine 11. The actual inlet gas temperature $T_{GASTEMP}$ drops to a certain level and then asymptotically approaches the engine correlated temperature along a path similar to that of the actual exhaust-manifold temperature $T_{EXMTEMP}$.

If the inlet gas temperature $T_{GAS}$ was estimated with the inlet gas temperature $T_0$ upon the stop of the engine 11 as the initial value, the estimation could not reflect a decrease in the temperature of the exhaust gas due to the actual exhaust-manifold temperature $T_{EXMTEMP}$ and thus could not provide an accurate result, as illustrated with a broken line in FIG. 4A. In particular, the broken line would have a large difference from the thick solid line (actual inlet gas temperature $T_{GASTEMP}$) within a relatively short time from the stop of the engine 11.

In contrast, the inlet gas temperature $T_{GAS}$ is calculated with the exhaust-manifold temperature $T_{EXM}$ upon the stop of the engine 11 as the initial value in the temperature estimating control. This control can improve the accuracy of estimating the inlet gas temperature $T_{GAS}$. In other words, the estimated inlet gas temperature $T_{GAS}$ varies along with the actual inlet gas temperature $T_{GASTEMP}$, such that the estimated inlet gas temperature $T_{GAS}$ is substantially identical to the actual inlet gas temperature $T_{GASTEMP}$ at any time regardless of an elapsed time from the stop of the engine 11, as illustrated with a solid line in FIG. 4A.

Figure 4B:
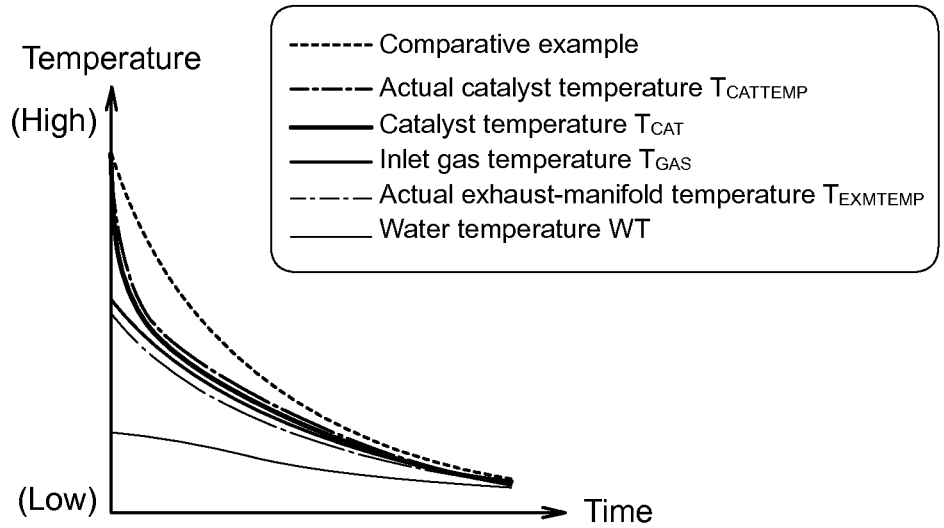
FIG. 4B is a graph illustrating an example relationship between the estimated catalyst temperature $T_{CAT}$ and the actual catalyst temperature $T_{CATTEMP}$.

FIG. 4B is a graph illustrating the relationship between the catalyst temperature $T_{CAT}$ and its actual value (actual catalyst temperature $T_{CATTEMP}$). If the engine 11 is stopped before sufficient warming, the low actual exhaust-manifold temperature $T_{EXMTEMP}$ affects both the actual inlet gas temperature $T_{GASTEMP}$ and the actual catalyst temperature $T_{CATTEMP}$. If the catalyst temperature $T_{CAT}$ was estimated with the inlet gas temperature $T_{GAS}$ not based on the actual exhaust-manifold temperature $T_{EXMTEMP}$, the estimation would provide an inaccurate temperature higher than the actual catalyst temperature $T_{CATTEMP}$, as illustrated with a broken line in FIG. 4B. In contrast, the catalyst temperature $T_{CAT}$ is estimated with the inlet gas temperature $T_{GAS}$ estimated with the exhaust-manifold temperature $T_{EXM}$ upon the stop of the engine 11 as the initial value in the temperature estimating control. The estimation of the catalyst temperature $T_{CAT}$ thus can reflect the actual exhaust-manifold temperature $T_{EXMTEMP}$, and provide accurate catalyst temperature $T_{CAT}$. In other words, the estimated catalyst temperature $T_{CAT}$ varies along with the actual catalyst temperature $T_{CATTEMP}$, such that the estimated catalyst temperature $T_{CAT}$ is substantially identical to the actual catalyst temperature $T_{CATTEMP}$ at any time regardless of an elapsed time from the stop of the engine 11, as illustrated with a thick solid line in FIG. 4B.

(1) In the temperature estimating control executed in the electronic controller 1, the gas temperature $T_{GAS}$ at the inlet of the catalyst 5 is estimated through a first-order lag operation with the exhaust-manifold temperature $T_{EXM}$ upon the stop of the engine 11 as the initial temperature and the engine correlated temperature acquired during the stop of the engine 11 as a target temperature. This control enables accurate detection of a decrease in the temperature of air remaining in the intake and exhaust paths after the stop of the engine 11, and thus can improve the accuracy of estimating the catalyst temperature $T_{CAT}$.

(2) The catalyst temperature $T_{CAT}$ is estimated through double first-order lag operations in the temperature estimating control. The primary first-order lag operation uses the engine correlated temperature as a target temperature, and the secondary first-order lag operation uses the inlet gas temperature $T_{GAS}$ as a target temperature. This control enables accurate detection of a decrease in the temperature of the catalyst 5 in response to a decrease in the temperature of air remaining in the intake and exhaust paths, and thus can improve the accuracy of estimating the catalyst temperature $T_{CAT}$.

(3) The first time constant $K_{CAT}$, the second time constant $K_{GAS}$, and the third time constant $K_{EXM}$ are determined based on the speed V in the temperature estimating control. This control enables appropriate consideration of the effects of heat taken away to the outside of the running vehicle 10 by wind, and thus enables accurate detection of decreases in the temperatures of the catalyst 5, exhaust air remaining in the exhaust path, and the exhaust manifold 6.

In addition, the first time constant $K_{CAT}$, the second time constant $K_{GAS}$, and the third time constant $K_{EXM}$ are individually determined. The time constants thus can provide rates of temperature change suitable for variations in the catalyst temperature $T_{CAT}$, the inlet gas temperature $T_{GAS}$, and the exhaust-manifold temperature $T_{EXM}$, respectively. In other words, this control can individually determine rates of temperature drop depending on the thermal capacity of the catalyst 5 and the volume of the exhaust manifold 6, and thus can improve the accuracy of estimating the temperatures.

The second time constant $K_{GAS}$ decreases with an increase in the speed V. This feature enables accurate estimation of the amount of heat taken away from the exhaust manifold 6 to the outside of the vehicle 10, and thus can further improve the accuracy of estimating the inlet gas temperature $T_{GAS}$. The third time constant $K_{EXM}$ also decreases with an increase in the speed V. This feature can improve the accuracy of estimating the exhaust-manifold temperature $T_{EXM}$. In contrast, the gradient of the first time constant $K_{CAT}$ against the speed V has a smaller absolute value than that of the second time constant $K_{GAS}$ (or the gradient is positive). This feature enables accurate estimation of the effects of the thermal capacity of the carrier included in the catalyst 5, and thus can further improve the accuracy of estimating the catalyst temperature $T_{CAT}$.

(4) In the temperature estimating control, the exhaust-manifold temperature $T_{EXM}$ is estimated through a first-order lag operation with the exhaust-manifold temperature $T_{EXM}$ upon the stop of the engine 11 as the initial temperature and the engine correlated temperature acquired during the stop of the engine 11 as a target temperature. This control enables accurate detection of a decrease in the temperature of air remaining in the intake and exhaust paths after the stop of the engine 11, and thus can improve the accuracy of estimating the exhaust-manifold temperature $T_{EXM}$.

(5) The temperature (water temperature WT) of engine cooling water is used as an engine correlated temperature in the temperature estimating control. This control enables accurate detection of the temperature of the engine 11 in the standby mode, and thus can improve the accuracy of estimating the catalyst temperature $T_{CAT}$, the inlet gas temperature $T_{GAS}$, and the exhaust-manifold temperature $T_{EXM}$.

The temperature estimation based on the water temperature WT is suitable for the catalyst 5 disposed relatively close to the engine 11, e.g., the catalyst 5 included in the exhaust manifold 6 (the catalyst 5 of a manifold catalytic converter (MCC) type) or the catalyst 5 disposed inside the engine compartment.

(6) The temperature estimation may use the air temperature (intake-air temperature AT) in the intake path 7 as an engine correlated temperature. This control enables accurate detection of the temperature of air remaining in the intake and exhaust paths of the engine 11, and thus can improve the accuracy of estimating the catalyst temperature $T_{CAT}$, the inlet gas temperature $T_{GAS}$, and the exhaust-manifold temperature $T_{EXM}$.

The temperature estimation based on the intake-air temperature AT is suitable for the catalyst 5 disposed relatively far from the engine 11, e.g., the catalyst 5 disposed beneath the floor of the vehicle 10 (the catalyst 5 of an under-floor catalytic converter (UCC) type) or the catalyst 5 disposed outside the engine compartment.

(7) In the temperature estimating control, the engine correlated temperature is acquired while the power switch 9 is closed during the stop of the engine 11, and the catalyst temperature $T_{CAT}$, the inlet gas temperature $T_{GAS}$, and the exhaust-manifold temperature $T_{EXM}$ are estimated based on the engine correlated temperature before the restart of the engine 11. The temperature estimation control based on information acquired during the stop of the engine 11 enables highly accurate estimation of temperatures in the exhaust system immediately after the restart of the engine 11.

The temperature estimating apparatus according to the embodiment thus can estimate temperatures in the exhaust system with high accuracy.

[5. Modifications]

The above-described embodiments may be modified in various manners without departing from the gist of the invention. The individual features of the embodiments may be selectively employed as necessary or properly combined with one another. For example, although the vehicle 10 is a hybrid car including the engine 11 and the motor 12 in the above-described embodiments, the motor 12 is not an essential component for the temperature estimating control. The temperature estimating control may also be applied to a vehicle 10 including the engine 11 alone. In this case, the temperatures in the exhaust system can be estimated during the idling stop of the engine 11, for example.

The flowchart of FIG. 3 illustrates the estimation of the inlet gas temperature TEAS and the exhaust-manifold temperature $T_{EXM}$ with the water temperature WT as a target temperature. Alternatively, the water temperature WT may be replaced with the intake-air temperature AT, the temperature of engine oil in the engine 11, the temperature of the cylinder block, the air temperature in the engine compartment, or a value reflecting the average or variance of these temperatures. The substitute temperature at least needs to be correlated with the temperature of the engine 11 in the standby mode.

Although the exhaust system of the engine 11 includes no thermosensor in the above-described embodiments, it may include one or more thermosensors. In specific, the temperature estimating apparatus may use both the temperatures estimated in the temperature estimating control and the actual temperature(s) detected with the thermosensor(s), such that one contributes to the correction of the other or one serves as fail-safe information for the other. The actual temperature(s) in the exhaust system are not necessarily required in the temperature estimating control itself, but can increase the information value of the temperatures estimated in the temperature estimating control.

Figure 2B:
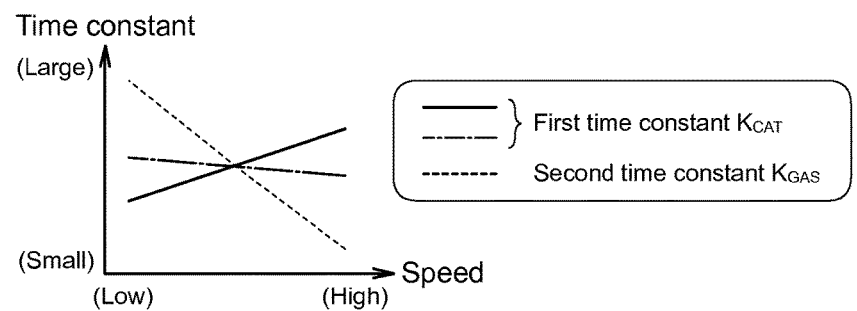
FIG. 2B is a graph illustrating example relationships between a speed and time constants.

Although the time constants can be each approximated as a linear expression against the speed V as illustrated in FIG. 2B in the above-described embodiments, the time constants may each have any other relationship with the speed V. Rates of change in the catalyst temperature $T_{CAT}$, the inlet gas temperature $T_{GAS}$, and the exhaust-manifold temperature $T_{EXM}$ against the speed V may vary depending on the shapes of the catalyst 5 and the exhaust manifold 6, the arrangement of these components relative to the engine 11, and flows of wind hitting the components. Accordingly, the time constants may be appropriately measured through vehicle tests or experiments and determined with a control map based on the speed V.

The gradients of the time constants against the speed V illustrated in FIG. 2B each may be positive or negative depending on the (recurrence) formula in the first-order lag operation. Even with the inverted gradients (gradients with inverted signs), the temperature estimating control can achieve first-order lag operations having the same functions as those in the above-described embodiments. The features of the time constants against the speed V can be appropriately determined based on the formula in the first-order lag operation.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST

1 electronic controller
2 air thermosensor
3 water thermosensor
4 speed sensor
5 catalyst
6 exhaust manifold
21 acquirer
22 estimator
$T_{CAT}$ catalyst temperature
$T_{GAS}$ inlet gas temperature
$T_{EXM}$ exhaust-manifold temperature $K_{CAT}$ first time constant (for estimation of a catalyst temperature)

$K_{GAS}$ second time constant (for estimation of an inlet gas temperature)

$K_{EXM}$ third time constant (for estimation of an exhaust-manifold temperature)

The invention claimed is:

1. A vehicle, comprising:
   an engine mounted on the vehicle,
   an exhaust gas recirculator recirculating at least a part of an exhaust gas generated by the engine to an intake path of the engine;
   an engine starter/stopper selectively starting/stopping the engine based on driving conditions of the vehicle; and
   at least one of a plurality of sensors including an air thermosensor that detects an intake-air temperature of an engine, a water thermosensor that detects a water temperature of the engine, and an oil thermosensor that detects an oil temperature of the engine;
   a processing device and a storage storing a program that causes the processing device to:
   acquire an engine correlated temperature correlated with a temperature of an engine from the at least one of the plurality of sensors when the engine is stopped by the engine starter/stopper;
   estimate a catalyst temperature of a catalyst based on an inlet gas temperature indicating a temperature of exhaust gas at an inlet of the catalyst, the inlet gas temperature being estimated through a first-order lag operation with an exhaust-manifold temperature at a stop of the engine as an initial temperature and the acquired engine correlated temperature as a target temperature, the catalyst being disposed in an exhaust system of the engine;
   storing the estimated catalyst temperature in the storage; and
   control the exhaust gas recirculator using the stored estimated catalyst temperature when restarting the engine by the engine starter/stopper.

2. The vehicle according to claim 1, wherein the estimating step estimates the catalyst temperature through a first-order lag operation with the inlet gas temperature as a target temperature.

3. The vehicle according to claim 1, further comprising:
   a speed sensor that detects a running speed of the vehicle,
   wherein the estimating step estimates the catalyst temperature through a first-order lag operation with a first time constant determined based on the detected speed of the vehicle.

4. The vehicle according to claim 3, wherein the first time constant increases with an increase in the detected speed.

5. The vehicle according to claim 3, wherein the estimating step estimates the inlet gas temperature through the first-order lag operation with a second time constant determined based on the detected speed.

6. The vehicle according to claim 5, wherein the second time constant decreases with an increase in the detected speed.

7. The vehicle according to claim 1, further comprising:
   a speed sensor that detects a running speed of the vehicle,
   wherein the estimating step estimates the inlet gas temperature through the first-order lag operation with a second time constant determined based on the detected speed of the vehicle.

8. The vehicle according to claim 7, wherein the second time constant decreases with an increase in the detected speed.

9. The vehicle according to claim 1, wherein the estimating step estimates the exhaust-manifold temperature through a first-order lag operation with the engine correlated temperature as a target temperature.

10. The vehicle according to claim 1,
    wherein the acquiring step acquires at least one of the cooling water temperature, the air temperature in an intake path during the stop of the engine as the engine correlated temperature, and the oil temperature of the engine.

11. The vehicle according to claim 1, wherein the estimating step estimates the catalyst temperature while a main power of the vehicle is on during the stop of the engine.

* * * * *